Dec. 15, 1959     K. E. POPE     2,917,597

PRESSURE SENSING DEVICE

Filed Jan. 23, 1959

INVENTOR:
Kenneth E. Pope
BY

Attorney

United States Patent Office 2,917,597
Patented Dec. 15, 1959

2,917,597
PRESSURE SENSING DEVICE

Kenneth Elvin Pope, Albuquerque, N. Mex., assignor, by mesne assignments, to the United States of America as represented by the United States Atomic Energy Commission Application January 23, 1959, Serial No. 788,691

10 Claims. (Cl. 200—83)

This invention relates generally to pressure sensing devices, and more particularly to devices of this character which depend for their operation on an expansible pressure sensitive bellows member. The invention is specifically adapted to the measurement of rapidly changing barometric pressures, and also to other accurate pressure comparison.

It is frequently desirable to provide an airborne object with pressure sensitive means which will give an indication when the object reaches a predetermined altitude. Prior art devices for this purpose which fall into the same general class at the present invention are subject to several disadvantages. Conventionally, they employ a relatively rigid metallic bellows, expansible under pressure. A small displacement of the bellows is representative of a relatively large pressure change. Such a bellows requires extreme precision in manufacture. This fact, together with very small electrical contact travel, makes the device highly susceptible to vibration, shock, and acceleration. The present invention seeks to overcome these disadvantages by providing a unique form of flexible bellows referred to hereafter as a bladder, totally immersed in an incompressible fluid, which requires very little precision in manufacture and which is almost entirely insensitive to vibration, shock, and acceleration forces. This novel bladder construction makes possible a large displacement representation of a small change in pressure.

A general object of the invention, therefore, is to provide improved pressure sensitive means within a pressure sensing device to eliminate sensitivity to vibration, shock, and acceleration forces.

Another object is to provide improved pressure sensitive means in which a large displacement is representative of a small pressure change. A further disadvantage of prior art devices is their susceptibility to false indication in the presence of acoustical noise. This stems from the fact that such devices depend solely upon a pressure change to give an output, rather than upon a finite volume of air. As will be seen from the detailed description which follows, this invention has met and overcome this difficulty.

It is, therefore, a still further object of this invention to provide new and improved means for damping out the effects of acoustical noise.

It is another object of this invention to provide pressure sensing means which depend for their operation on a small finite volume of incoming air.

Other and further objects and advantages of the invention will be obvious from an understanding of the preferred embodiment to be described in connection with the appended drawings made a part of this specification.

The present invention employs a rigid air-tight housing which is divided internally by a flexible diaphragm into two pressure chambers. The first chamber transmits an adjustable preset pressure through the diaphragm to an incompressible non-conductive fluid contained within the second pressure chamber. A flexible bladder freely supported within the second pressure chamber and vented to atmosphere is expansible to connect electrically a pair of contacts within the second chamber at such time as the pressure altitude is equal to or greater than the net force exerted on the bladder through the incompressible fluid. An essential feature of the invention is the complete isolation of the flexible bladder within the incompressible fluid.

For purposes of illustration and description, a preferred embodiment of the invention has been chosen. However, this embodiment is in no way intended to be restrictive of the invention to the precise form disclosed. It is believed to explain the principles and application of the invention in practical form.

In the accompanying drawings, Fig. 1 shows a longitudinal section of the pressure sensing device.

Figure 1:
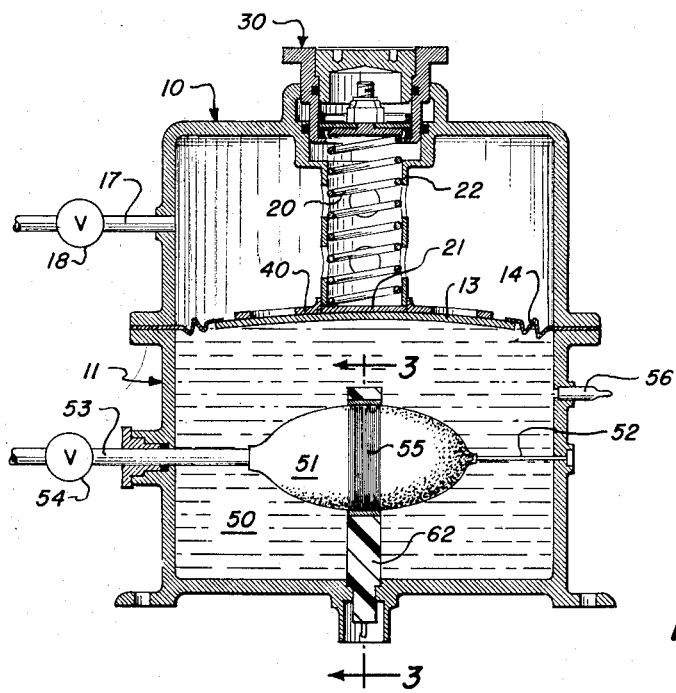
Figure 2:
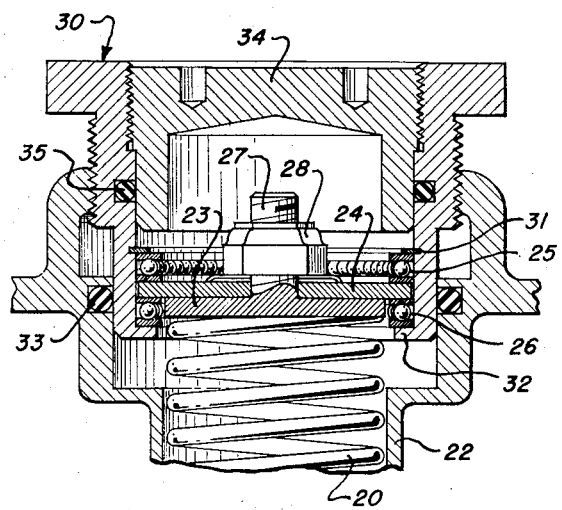
Fig. 2 is an enlarged fragmentary view of the spring adjustment means.

As shown in Fig. 1, the device consists of a first cylindrical pressure chamber 10, and a second mating pressure chamber 11 joined together by seam welding or other appropriate means to form an air-tight housing. Separating chambers 10 and 11 is a movable diaphragm consisting of a central rigid disk-like member 13 and peripheral convoluted portion 14 extending between the mating surfaces of chambers 10 and 11. Convoluted portion 14 is chosen such that there is no change in its spring constant with continuous loading, and is soldered or otherwise suitably jointed to diaphragm member 13 to form a hermetic seal between chambers 10 and 11. Suitable materials for convoluted portion 14 are an alloy sold under the trademark Elgiloy, and a nickel-chromium composition sold under the trademark Ni-Span-C. Chamber 10 is provided with pressure intake 17 which may be opened or closed through valve 18. Within chamber 10 is housed coil spring 20, the lower end of which is closed, ground and welded to attachment plate 21, which is in turn spot welded to the upper surface of rigid diaphragm member 13. Spring 20 is mounted in slidable relation to vertical support housing 22, which is integral with the top portion of first chamber 10. Spring 20 is preferably constructed of the same alloy as convoluted diaphragm portion 14. Vertical housing 22 should have a thermal coefficient of expansion substantially equal to that of spring 20. As best viewed in Fig. 2, the top of spring 20 is also closed, ground and welded to attachment plate 23. Bearing plate 24 is attached to plate 23 by means of threaded stud 27 and lock nut 28. Bearing plate 24 is further confined between thrust bearings 25 and 26, which are housed within rotatable spring adjustment member 30. Thrust bearing 25 is held in position by snap ring 31, and thrust bearing 26 is similarly positioned by flange 32.

Spring adjustment member 30 is externally threaded to be rotatably received within vertical support 22. An air-tight seal between these two members is provided by O-ring 33. Spring adjustment member 30 is also internally threaded to receive sealing plug 34, an O-ring seal 35 being provided between spring member 30 and plug 34.

With reference again to Fig. 1, vertical support 22 terminates at its lower end in over-pressure plate 40, which is designed to limit upward travel of center diaphragm portion 13. Plate 40 is provided with cutouts to eliminate any air trapped between plate 40 and diaphragm member 13 as a result of upward movement of the latter. Vertical housing 22 also contains vertical cutouts which, as will be seen later, provide for pressure equalization between the interior of housing 22 and chamber 10.

Chamber 11 is filled with incompressible non-conductive fluid 50 through pinch-off tube 56. Fluid 50 should be selected from a group of materials having low volatility over the expected range of operating temperatures, for example, silicones. Within fluid 50 and shown in an inflated position is flexible bladder 51, positioned freely by rigid centering support 52 and fill tube 53. Outside chamber 11, valve 54 is connected in bladder fill tube 53. Bladder 51 may be constructed of plastic, upon which conductive strip 55, composed of a material such as silver, may be electrodeposited. Alternatively, bladder 51 may be practically constructed of a .0007 inch thick gold foil which would eliminate the need for conductive strip 55.

Figure 3:
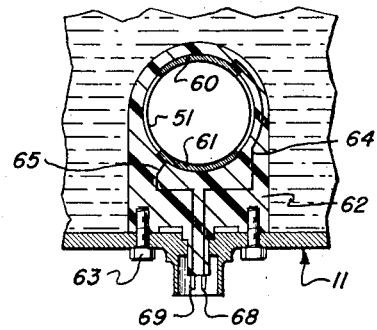
Fig. 3 shows a sectional view of the electrical contact support means taken along line 3—3 in Fig. 1.

Electrical contacts 60 and 61, as shown in Fig. 3, consisting of a pair of arcuate plates, are positioned opposite one another within the cylindrical bore of insulated support member 62, which is constructed, for example, of inspectable plastic and attached by appropriate fasteners 63 to the base of chamber 11. It is a distinct advantage that contacts 60 and 61 are hermetically sealed against outside air. Conductors 64 and 65, within support member 62, connect contacts 60 and 61 respectively to external terminals 68 and 69.

There are two general methods of operation available with this invention which we shall refer to as the absolute pressure measurement method and the differential pressure measurement method. These methods will now be discussed in this order, as applied specifically to a barometric switch.

*Absolute pressure measurement method*

In this method, chamber 10 is initially evacuated through pressure intake 17. When the carrying object in which the device is housed attains an altitude above the altitude at which indication is desired, referred to hereafter as "target altitude," bladder 51 is vented to atmosphere through fill tube 53 and valve 54. Through spring adjustment member 30, spring 20 and diaphragm member 13, a preset pressure is applied to incompressible fluid 50 in chamber 11 equal to the ambient pressure at the target altitude. This may be accomplished by rotating a dial (not shown) on the top of spring adjustment member 30 against a registraion mark (not shown) on vertical support 22. This dial may be graduated directly in units of pressure and may be linear or nonlinear, depending upon the selected characteristics of coil spring 20.

At altitudes in excess of the target altitude, bladder 51 will remain collapsed due to the net force exerted upon it through fluid 50, which is transmitted equally in all directions. As the carrying vehicle approaches the target altitude, the pressure within bladder 51 will increase, and when target altitude is reached, bladder 51 will expand rapidly so that conductive strip 55 on the surface of bladder 51 will connect contacts 60 and 61. This will in turn complete any desired external circuit which may be connected to the device through terminals 68 and 69.

If for any reason the pressure within bladder 51 should exceed the pressure exerted upon fluid 50, diaphragm member 13 will move upward until it meets overpressure plate 40. This limiting action will prevent bladder 51 from being expanded beyond its breaking point.

*Differential pressure method*

In this method, chamber 10 is no longer evacuated. Air at some preset pressure may be introduced through pressure inlet 17. This pressure may be regarded as a fixed reference. A force, in addition to this preset pressure, may now be applied to spring 20 by means of spring adjustment member 30, so that the net force on incompressible fluid 50 in chamber 11 is the sum of these two pressures. An indication will be given through contacts 60 and 61 when the pressure in bladder 51 equals the sum of the two above-mentioned pressures. Used as a barometric switch in an airborne object designed to be released in an upward direction from a carrying aircraft, the device operates in the following manner: At the moment of release from the aircraft, chamber 10 is vented to atmosphere and valved off through valve 18, so that it retains the pressure existing at that release altitude. After the object executes a loop through higher altitudes, a target altitude may be reached, for example, below that of the release altitude, at which point the ambient pressure sensed by bladder 51 will equal the combined reference pressure within chamber 10 and force exerted by spring 20 through diaphragm member 13 upon incompressible fluid 50. Therefore, the height of the target altitude as compared to that of the release altitude can be exactly controlled through spring adjustment member 30.

If, in the above example, the desired target altitude is above rather than below that of the release altitude, we may exert tension upon diaphragm member 13 through spring 20, instead of compression, so that the net force upon incompressible fluid 50 will be the difference between the release altitude pressure in chamber 10 and the force exerted through spring 20. In this case, however, it will become necessary to employ suitable timing mechanism whereby bladder 51 is vented to atmosphere only when the object is above the desired target altitude. When the pressure sensed in bladder 51 equals the difference between the reference pressure in chamber 10 and the spring force 20, which will occur at the target altitude, an indication will be given through contacts 60 and 61. Any tendency for pressure to build up within housing 22 as a result of upward movement of spring 20 is relieved through cutouts in housing 22 provided for that purpose.

The differential pressure method described above is also well adapted to the accurate comparison of pressures. For example, a known pressure may be introduced into chamber 10 through inlet 17, and an unknown pressure into bladder 51. Spring adjustment member 30 may then be rotated to either add or subtract from the known pressure in chamber 10 until such time as an indication is obtained through contacts 60 and 61. At this point one may simply read the magnitude of the difference pressure on the dial on top of spring adjustment member 30.

Bladder 51 may easily be designed to require a very small amount of air, less than a cubic inch, to go from a completely collapsed state to a completely expanded state. Nevertheless, a finite volume of air is required to accomplish switching, and not just a pressure change. This means that the device furnishes a step function in its output. Therefore, there will be no chatter prior to switch closure. Note also that pressure fronts created by undesirable sound waves can easily be prevented from giving false indications. In order that a noise frequency expand bladder 51 and close contacts 60 and 61, the positive half cycle of such frequency must be of a duration sufficient to pass a volume of air equal to the inflated bladder volume through the fill tube. Therefore, the bore of the fill tube may be selected with reference to the bladder volume so as to exclude acoustical frequencies.

Note further that since bladder 51 is isolated from the external housing by incompressible fluid 50, and since any body immersed in fluid appears as fluid, any mechanical vibrations occurring at the outer housing will not affect bladder 51. This eliminates the necessity for vibration and shock mounts and renders the device insensitive to acceleration forces.

It will be clear to skilled technicians that various changes may be made in the form, construction and arrangement of parts of this device without deviating from the scope of this invention or sacrificing any of its advantages. It is therefore to be understood that all matter herein should be regarded as illustrative and not as limitation.

What is claimed is:

1. A pressure-sensing device comprising a rigid housing divided internally by a flexible diaphragm into a first pressure chamber and a second pressure chamber, a first valve means connected to said first chamber and adapted to introduce air at preset pressure therein at a predetermined time, spring means extending within said first chamber and contacting said diaphragm for exerting a variable preset force upon said diaphragm, said second chamber containing a substantially incompressible, non-conductive fluid, an initially collapsed flexible bladder supported freely within said fluid, a second valve means for venting said bladder to atmosphere at a predetermined time, a continuous conductive layer intermediate the extremities of said bladder on the external surface thereof, a pair of electrical contacts supported within said second chamber and adapted to be electrically connected through said conductive layer in an inflated-bladder position, and means for connecting said contacts respectively to a pair of external terminals.

2. A device as in claim 1, in which said first chamber is evacuated.

3. A device as in claim 1 wherein said first chamber is vented to atmosphere through said first valve means.

4. A device as in claim 1 in which said diaphragm is composed of a central rigid disk-like member and a peripheral convoluted portion.

5. A device as in claim 4, in which said spring means has an enlargement adjacent the diaphragm limiting the travel of said diaphragm in one direction.

6. A device as in claim 1, wherein said spring means is adjustable through an externally rotatable member connected thereto.

7. A device as in claim 1 wherein said second valve means is connected in a bladder fill tube of predetermined bore.

8. A device as in claim 7 wherein the inflated bladder volume exceeds the volume of air admissible through the fill tube during one-half cycle of acoustical noise frequencies.

9. A device as in claim 1, wherein said pair of electrical contacts are formed of arcuate plates having their inner surfaces engageable with the bladder conductive layer.

10. A pressure sensing device comprising a housing divided by yieldable means into a first pressure chamber and a second pressure chamber, a first valve means connected to said first chamber and adapted to control fluid pressure therein, means extending within said first chamber for exerting a force upon said yieldable means, said second chamber adapted to contain a substantially incompressible nonconductive fluid, collapsible means supported within said second chamber, a second valve means for venting said collapsible means, a conductor carried by said collapsible means, a pair of electrical contacts adapted to be electrically connected through said conductor, and means for connecting said contacts respectively to a pair of external terminals.

References Cited in the file of this patent

UNITED STATES PATENTS

| 286,888 | Wiswall | Oct. 16, 1883 |
| 1,076,091 | Allen | Oct. 21, 1913 |
| 1,255,034 | Mason | Jan. 29, 1918 |
| 1,456,663 | Willis | May 29, 1923 |
| 2,795,668 | Puckett | June 11, 1957 |

FOREIGN PATENTS

| 6,129 | Great Britain | Dec. 14, 1911 |
| 460,738 | Great Britain | Feb. 3, 1937 |